United States Patent [19]

Kitagishi et al.

[11] Patent Number: 4,907,868

[45] Date of Patent: Mar. 13, 1990

[54] OPTICAL SYSTEM FOR DEFLECTING IMAGE

[75] Inventors: Nozomu Kitagishi, Kanagawa; Shoichi Yamazaki, Tokyo, both of Japan

[73] Assignee: Canon Kabushiki Kaisha, Tokyo, Japan

[21] Appl. No.: 156,930

[22] Filed: Feb. 17, 1988

[30] Foreign Application Priority Data

Feb. 18, 1987 [JP] Japan .............................. 62-035266
Sep. 29, 1987 [JP] Japan .............................. 62-245247
Oct. 30, 1987 [JP] Japan .............................. 62-276717
Nov. 20, 1987 [JP] Japan .............................. 62-293133

[51] Int. Cl.$^4$ .............................................. G02B 27/64
[52] U.S. Cl. .................................. 350/463; 350/500; 350/571
[58] Field of Search ...................... 350/463, 571, 500

[56] References Cited

U.S. PATENT DOCUMENTS

| 3,560,080 | 2/1971 | Wilczynski et al. ............... 350/247 |
| 4,387,970 | 6/1983 | Brueggemann .................... 350/463 |
| 4,844,602 | 7/1989 | Kitagishi et al. ................... 350/500 |

*Primary Examiner*—Bruce Y. Arnold
*Assistant Examiner*—Rebecca D. Gass
*Attorney, Agent, or Firm*—Fitzpatrick, Cella, Harper & Scinto

[57] ABSTRACT

An optical system for deflecting an image by decentering a portion of a photographic lens in a direction perpendicular to an optical axis, wherein the decentering aberrations produced by the decentering are reduced.

16 Claims, 30 Drawing Sheets

TEMPORARY

UNITED STATES PATENT AND TRADEMARK OFFICE
CERTIFICATE OF CORRECTION

PATENT NO. : 4,907,868  Page 1 of 4
DATED : March 13, 1990
INVENTOR(S) : NOZOMU KITAGISHI, ET AL.

It is certified that error appears in the above-identified patent and that said Letters Patent is hereby corrected as shown below:

Column 1:
    Line 51, "tee" should read -- the --.

Column 2:
    Line 33, "8(A)." should read -- 8(A), --.
    Line 36, "2(B)," should read -- 12(B), --.
    Line 53, "i" should read -- is --.

Column 3:
    Line 60, "$(IIIE^2) = \alpha_p^2 III_p - 2\alpha_p \overline{\alpha_p} II_p + \overline{\alpha_p} I_p \quad (h)$"
should read -- $(IIIE^2) = \alpha_p^2 III_p - 2\alpha_p \overline{\alpha_p} II_p + \overline{\alpha_p}^2 I_p \quad (h)$ --.

Line 67, "$(\Delta E^3) = -\alpha_p^2 \{\overline{\alpha_p} V_p - \alpha_p (III_p + P_p)\} + \quad (m)$"
should read -- $(\Delta E^3) = -\alpha_p^2 \{\alpha_p V_p - \overline{\alpha_p} (III_p + P_p)\} + \quad (m)$ --.

UNITED STATES PATENT AND TRADEMARK OFFICE
CERTIFICATE OF CORRECTION

PATENT NO. : 4,907,868      Page 2 of 4
DATED : March 13, 1990
INVENTOR(S) : NOZOMU KITAGISHI, ET AL.

It is certified that error appears in the above-identified patent and that said Letters Patent is hereby corrected as shown below:

Column 4:

Line 3, "$2\alpha_p\alpha_p\{\alpha_pIII_p-\overline{\alpha}_pII_p\}-$" should read -- $2\alpha_p\overline{\alpha}_p\{\alpha_pIII_p-\overline{\alpha}_pII_p\}-$ --.

Line 41, "height $\overline{e}$" should read -- height $\overline{h}$ --.

Line 60, "o" should read -- of --.

Line 68, "large Also," should read -- large. Also, --.

Column 5:

Line 49, "of" (second occurence) should be deleted.

Column 9:

Line 61, "o" should read -- of --.

UNITED STATES PATENT AND TRADEMARK OFFICE
CERTIFICATE OF CORRECTION

PATENT NO. : 4,907,868         Page 3 of 4
DATED      : March 13, 1990
INVENTOR(S): NOZOMU KITAGISHI, ET AL.

It is certified that error appears in the above-identified patent and that said Letters Patent is hereby corrected as shown below:

Column 10:
    Line 2, close up right margin.
    Line 3, close up left margin.

Column 11:
    Line 15, "features" should read -- features. --

Column 12:
    Line 9, "decentering" should read
       -- decentering, --.
    Line 12, "purpose" should read -- purpose. --

Column 15:
    Line 9, "$-0.012 <\, _n v_{g,F} - 0.6438 + 0.001682 \cdot\, _n v_d < -0.003 \quad (14)$" should read -- $-0.012 <\, _n \theta_{g,F} - 0.6438 + 0.001682 \cdot\, _n v_d < -0.003 \quad (14)$ --.

UNITED STATES PATENT AND TRADEMARK OFFICE
CERTIFICATE OF CORRECTION

PATENT NO. : 4,907,868

DATED : March 13, 1990

INVENTOR(S) : NOZOMU KITAGISHI, ET AL.

It is certified that error appears in the above-identified patent and that said Letters Patent is hereby corrected as shown below:

Column 16:

Line 53, "add" should read --and--.

Column 21:

Line 8, "move" should read -- moved --.

Line 28, "t" should read -- to --.

Column 22:

Line 37, "S=(RB+RA)/((RB-RA)" should read
-- S=(RB+RA)/(RB-RA) --.

Line 33, "tive," should read -- tively, --.

Line 38, "o" should read -- of --.

Column 23:

Line 18, "$_p\theta_d$" should read -- $_p\upsilon_d$ --.

Signed and Sealed this

Fourth Day of August, 1992

Attest:

DOUGLAS B. COMER

Attesting Officer

Acting Commissioner of Patents and Trademarks